(12) United States Patent
Heo et al.

(10) Patent No.: US 10,007,541 B2
(45) Date of Patent: Jun. 26, 2018

(54) METHOD FOR OPERATING A MOBILE VIRTUAL ENVIRONMENT UPON CONNECTION TO A HOST COMPUTER

(75) Inventors: Sung-kwan Heo, Seoul (KR); Sung-do Moon, Seongnam-si (KR); Byung-woan Kim, Seoul (KR); Seong-yeol Park, Yongin-si (KR); Kyung-ah Chang, Seoul (KR); Min-sung Jang, Seoul (KR); Sang-bum Suh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1371 days.

(21) Appl. No.: 12/207,677

(22) Filed: Sep. 10, 2008

(65) Prior Publication Data

US 2009/0241110 A1  Sep. 24, 2009

(30) Foreign Application Priority Data

Mar. 20, 2008 (KR) ........................ 10-2008-0025900

(51) Int. Cl.
*G06F 9/455* (2018.01)
(52) U.S. Cl.
CPC ................................ *G06F 9/45537* (2013.01)
(58) Field of Classification Search
CPC ... G06F 9/455; G06F 9/45537; G06F 9/45558
See application file for complete search history.

(56) References Cited

U.S. PATENT DOCUMENTS

| | | | |
|---|---|---|---|
| 6,618,736 B1 * | 9/2003 | Menage | |
| 7,028,305 B2 * | 4/2006 | Schaefer | 719/310 |
| 7,441,108 B2 * | 10/2008 | Fisher et al. | 712/227 |
| 7,496,931 B2 * | 2/2009 | Cook et al. | 719/327 |
| 7,580,826 B2 | 8/2009 | Vega et al. | |
| 7,606,973 B2 * | 10/2009 | Bao et al. | 711/115 |
| 7,865,893 B1 * | 1/2011 | Omelyanchuk et al. | 718/1 |
| 7,913,252 B2 * | 3/2011 | Shlomai | 718/1 |
| 7,926,054 B2 * | 4/2011 | Sonderegger et al. | 718/1 |
| 8,505,006 B1 * | 8/2013 | Larkin et al. | 718/1 |
| 2003/0179240 A1 * | 9/2003 | Gest | 345/779 |
| 2006/0004554 A1 | 1/2006 | Vega et al. | |
| 2006/0047604 A1 * | 3/2006 | Kraft-Oz et al. | 705/59 |

FOREIGN PATENT DOCUMENTS

| | | |
|---|---|---|
| KR | 10-2006-0047766 A | 5/2006 |
| KR | 10-2006-0062587 A | 6/2006 |

OTHER PUBLICATIONS

Korean Office Action dated May 13, 2014 in counterpart Korean Patent Application No. 10-2008-0025900 (8 pages, in Korean with English Translation).

* cited by examiner

*Primary Examiner* — David J Huisman
(74) *Attorney, Agent, or Firm* — NSIP Law

(57) ABSTRACT

A virtual environment system and a method of operating the same are provided. The virtual environment system includes a virtual operating system (OS) unit to operate a virtual OS installed in a mobile storage medium in a host OS installed in a host computer, to attach a virtual resource included in the virtual OS to the host OS, and to perform arbitration so that a virtual process operated in the virtual OS uses the virtual resource. The system includes a user interface unit to provide a virtual desktop screen to allow a user to use the virtual process in the virtual environment provided by the virtual OS.

9 Claims, 6 Drawing Sheets

METHOD FOR OPERATING A MOBILE VIRTUAL ENVIRONMENT UPON CONNECTION TO A HOST COMPUTER

CROSS-REFERENCE TO RELATED APPLICATION

This application claims the benefit of Korean Application No. 2008-25900, filed Mar. 20, 2008, in the Korean Intellectual Property Office, the disclosure of which is incorporated herein by reference.

BACKGROUND OF THE INVENTION

1. Field of the Invention

Aspects of the present invention relate to a virtual environment system and a method of operating the same, and more particularly, to a virtual environment system that can be used in another computer by storing a personal computing environment in a mobile storage medium, and a method of operating the same.

2. Description of the Related Art

Recently, a technology to enable an application program or an operating system (OS) stored in one computer to be used in another computer has been vigorously researched and developed. As examples, a process migration technology, a virtual machine (VM) migration technology based on system virtualization, and a packaging technology by a server manager have been developed.

A process migration technology provides application programs or OS with mobility. That is, a source code of an application program is modified such that the application program installed in a computer is stored in a mobile storage medium and then stored in another computer. However, this method is inefficient since a source code of an existing application program or an OS is modified and rebuilt to be another version.

In addition, a VM migration technology based on system virtualization moves the computer operating environment of a user, using a storage space of gigabyte units. Consequently, a boot time is long and the performance of an application program is slowed down.

Finally, in a packaging technology by a server manager, a manager packages one or more application programs and OS in a server, and a plurality of users move the packaged application programs to individual computers in a streaming manner. Accordingly, users can use the application program and OS without installation. However, experts perform packaging and ordinary users generally cannot perform packaging.

Therefore, there is a need for a virtual environment system that can be used in another computer by storing a personal computing environment in a mobile storage medium, and a method for operating the same.

SUMMARY OF THE INVENTION

Aspects of the present invention provide a virtual environment system that uses a personal computing environment in a virtual environment without newly installing or setting the personal computing environment in another computer, and a method of operating the same.

According to an aspect of the present invention, there is provided a virtual environment system to operate a virtual operating system (OS) installed in a mobile storage medium, the virtual environment system including: a virtual OS unit to operate the virtual OS installed in the mobile storage medium in a host OS installed in a host computer, to control an attaching of a virtual resource included in the virtual OS to the host OS, and to perform an arbitration so that a virtual process operated in the virtual OS uses the virtual resource; and a user interface unit to provide a virtual desktop screen so that a user uses the virtual process in a virtual environment provided by the virtual OS.

The virtual environment system may further include a virtual management unit to manage a launching and a termination of the virtual OS so that the virtual process is operated in the host computer using the virtual OS.

The virtual environment system may further include a virtual management unit to attach the virtual resource to the host OS and to start the virtual environment if the user logs into the virtual environment using a log-in screen provided by the user interface unit.

The virtual management unit may store, in the mobile storage medium, a file generated by the virtual process in the virtual environment and/or a program downloaded in the virtual environment if the virtual environment is terminated.

The virtual management unit may ensure that the generated file and/or the downloaded program do not remain in the host computer or the host OS.

The mobile storage medium may be a portable storage medium or a cyber folder.

The user interface unit may display an icon for changing between an environment using the host OS and the virtual environment using the virtual OS on the virtual desktop screen.

The virtual OS unit may include a process management unit to determine whether an input system call is generated by the virtual process, and a virtual resource management unit to enable the system call to access the virtual resource provided by the virtual OS if the process management unit determines that the system call is generated by the virtual process.

The virtual resource management unit may include: a virtual configuration management unit to enable the system call to access virtual configuration data of the virtual OS that is attached to the host OS if the system call requests access to a configuration; a virtual file I/O management unit to enable the system call to access a file stored in the mobile storage medium if the system call requests file I/O; and a virtual dynamic link library (DLL) management unit to use a virtual DLL of the virtual OS that is attached to the host OS if the system call requests a DLL.

The virtual resource management unit may further include a virtual service management unit to provide a virtual service program operated for the virtual process in order to execute a real service if the system call requests use of a service program.

The virtual resource management unit may further include a virtual desktop management unit to provide the virtual environment with a user computing environment set by the user, wherein the user interface unit generates the virtual desktop screen according to the user computing environment.

The virtual resource may include registry data, file input and output information, and DLL information if the host OS and the virtual OS are WINDOWS™, and the registry data is attached to a registry of the host OS.

According to another aspect of the present invention, there is provided a method of operating a virtual environment system, the method including: attaching a virtual resource of a virtual operating system (OS) installed in a mobile storage medium to a host OS of a host computer if the mobile storage medium is communicably connected to the host computer; providing a virtual desktop screen such that a user uses the virtual process in a virtual environment provided by the virtual OS; performing arbitration so that the virtual resource of the virtual OS is used if a system call is generated by the virtual process installed in the mobile storage medium; and performing virtualization corresponding to the system call using the virtual resource.

The attaching of the virtual resource may include: providing a log-in screen so that the user logs into the virtual OS; logging in the virtual environment using the log-in screen; and attaching the virtual resource to the host OS and starting the virtual environment.

The method may further include storing, in the mobile storage medium, a file generated by the virtual process in the virtual environment and/or a program downloaded in the virtual environment if the virtual environment is terminated.

The performing of the arbitration may include: accessing virtual configuration data of the virtual OS that is attached to the host OS if the system call requests access to a configuration; controlling a path to access a file stored in the mobile storage medium if the system call requests file I/O; and processing to use a virtual DLL of the virtual OS that is attached to the host OS if the system call requests a DLL.

The performing of the arbitration may further include providing a virtual service program operated for the virtual process in order to execute a real service if the system call requests use of a service program.

According to yet another aspect of the present invention, there is provided a host computer to operate a virtual operating system (OS) installed in a mobile storage medium, the host computer including: a virtual OS unit to operate the virtual OS installed in the mobile storage medium in a host OS installed in the host computer, to control an attaching of a virtual resource included in the virtual OS to the host OS, and to perform an arbitration so that a virtual process operated in a virtual environment provided by the virtual OS uses the virtual resource.

According to still another aspect of the present invention, there is provided a mobile storage medium to connect to a host computer for operating a virtual environment, the mobile storage medium including: a storage unit to store a virtual operating system (OS) providing a virtual environment on the host computer without installing programs and files onto the host computer, wherein a virtual resource included in the virtual OS attaches to a host OS of the host computer when the mobile storage medium connects to the host computer, and the host computer performs an arbitration so that a virtual process operated in the virtual OS uses the virtual resource.

According to another aspect of the present invention, there is provided a virtual environment system to operate a virtual operating system (OS), the virtual environment system including: a mobile storage medium to store a virtual operating system (OS) providing a virtual environment; and a host computer including: a virtual OS unit to operate the virtual OS installed in the mobile storage medium in a host OS of the host computer, to control an attaching of a virtual resource included in the virtual OS to the host OS, and to perform an arbitration so that a virtual process operated in the virtual environment provided by the virtual OS uses the virtual resource, wherein the mobile storage medium provides the virtual environment on the host computer without installing programs and files onto the host computer.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
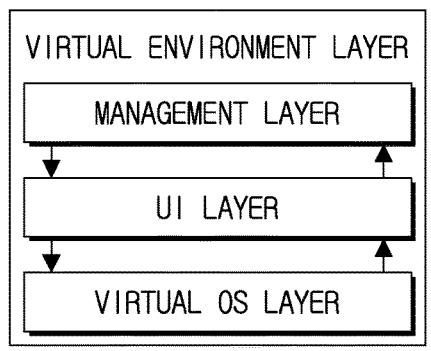
FIG. 1 illustrates a virtual environment layer corresponding to a virtual environment system according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 illustrates a virtual environment layer corresponding to a virtual environment system according to an embodiment of the present invention. Referring to FIG. 1, the virtual environment layer is a layer of a mobile storage medium, and provides a virtual resource that is used by an application program operated in the virtual environment. The virtual environment layer includes a virtual operating system (OS) layer in which a virtual OS is installed, a user interface (UI) layer that provides a desktop screen used in the virtual OS, and a management layer that manages the virtual OS and a UI.

The virtual environment layer provides software mobility based on virtualization of the OS. Software mobility enables a user to use a personal computing environment in any computer using the virtual OS installed in the mobile storage medium. That is, if the user of the virtual OS installed in the mobile storage medium stores programs, files, and/or a desktop environment in the mobile storage medium, software mobility enables the user to use the stored programs, files, and/or the desktop environment through the virtual OS in the mobile storage medium.

Figure 2:
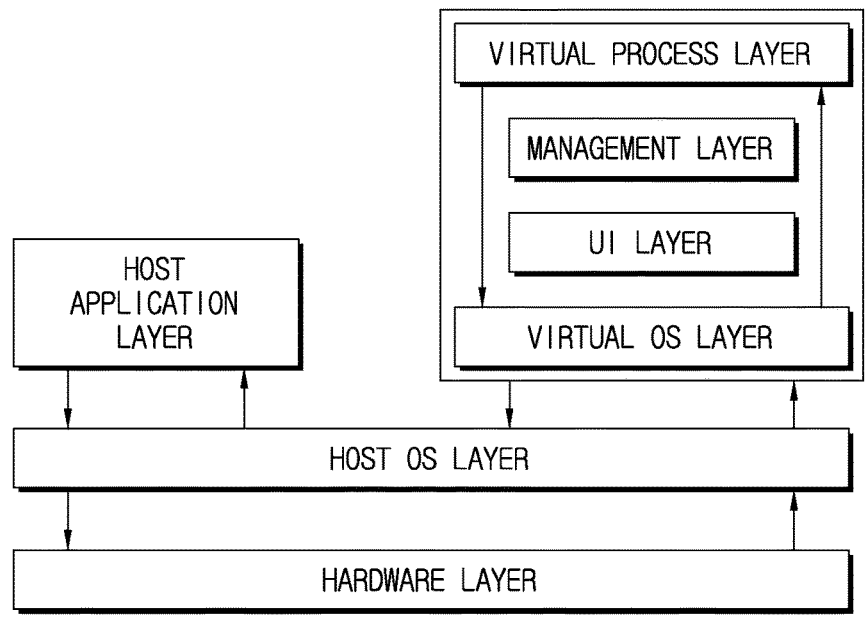
FIG. 2 illustrates layers of a host computer when a user of a virtual environment installs a desired application in a mobile storage medium.

FIG. 2 illustrates layers of a host computer when the user of the virtual environment installs a desired application in the mobile storage medium. Referring to FIG. 2, the user carries out the virtual OS installed in the mobile storage medium using the host computer, and downloads a desired file or program from a web server and installs the desired file or program in the mobile storage medium, or installs a desired file or program input from a drive (such as a CD drive) in the mobile storage medium. Therefore, the virtual environment of the mobile storage medium includes programs operated in the virtual environment (that is, a virtual process layer), as well as the virtual OS layer, the UI layer, and the management layer that manages the state of the virtual environment.

The layers of the host computer in FIG. 2 include a hardware layer, a host OS layer, a host application layer, and a virtual environment layer. The hardware layer includes hardware such as a hard disk drive, a graphic card, a read only memory (ROM), and a random access memory (RAM). The host OS layer controls hardware installed in the host computer using an OS (such as WINDOWS™, Mac, Linux, or Unix), and manages application programs. The host application layer receives inputs of data from the user or provides the user with information using an application program.

A system call occurring in the host application layer transmits a request for access corresponding to the system call to a host OS in the host OS layer (①~②). A system call occurring in the virtual process layer transmits a request for access corresponding to the system call to the host OS after virtualization is performed in the virtual OS layer (③→④→⑤→⑥).

Figure 3:
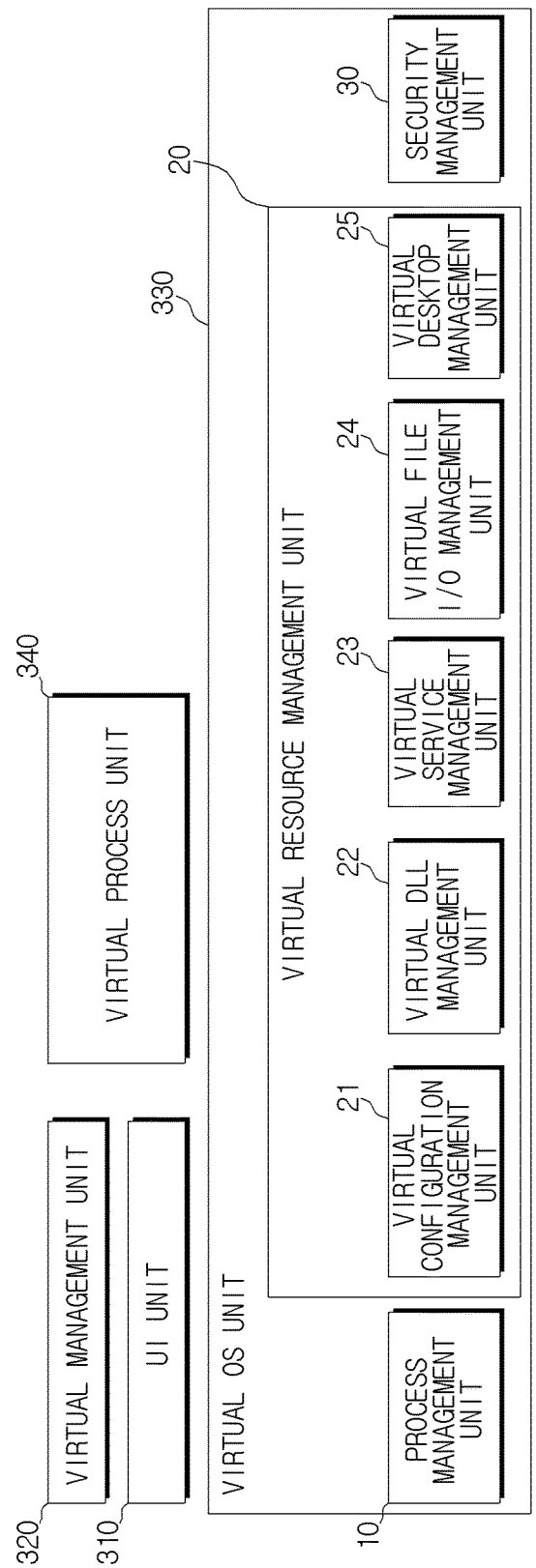
FIG. 3 illustrates a virtual environment system according to an embodiment of the present invention.

FIG. 3 illustrates a virtual environment system according to an embodiment of the present invention. As described above, the virtual environment system provides a virtual OS to provide the user with a virtual environment, and a graphic user interface (GUI) screen for the virtual environment. Furthermore, the virtual environment system is installed in a mobile storage unit that may be, for example, a portable storage medium (such as a universal serial bus (USB) memory or a flash ROM), or a cyber folder on the web.

Referring to FIG. 3, the virtual environment system includes a UI unit 310, a virtual management unit 320, and a virtual OS unit 330. A virtual process unit 340 is a storage space in the mobile storage medium that stores programs and/or files installed in the mobile storage medium.

The UI unit 310 provides a log-in screen through which the user can use the virtual environment, a virtual desktop screen that is similar to a desktop screen of the host OS, and a GUI that performs screen shifts between the host OS and the virtual OS. Through the virtual desktop screen, the user can execute or use a virtual process in the virtual environment provided by the virtual OS. That is, the user activates a desired program on the virtual desktop screen and can perform a desired operation. A virtual process is a program operated in the virtual environment, and a host process is a program operated in the host computing environment.

Figure 4:
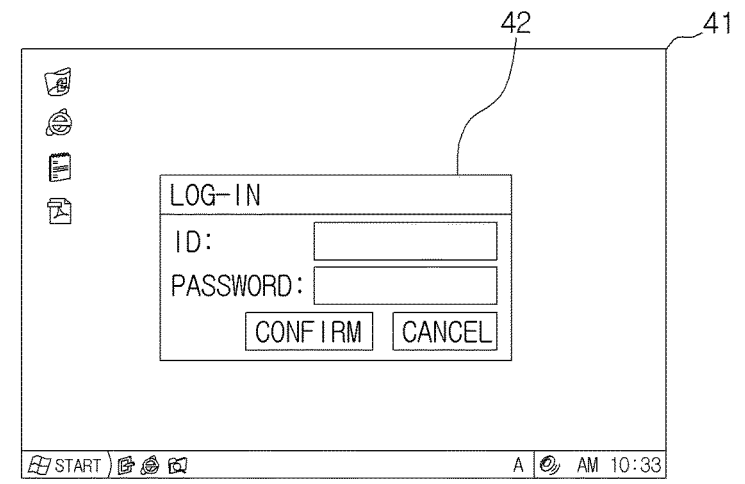
FIG. 4 illustrates an example of a graphical user interface (GUI) screen provided by a user interface unit according to an embodiment of the present invention.
Figure 4:
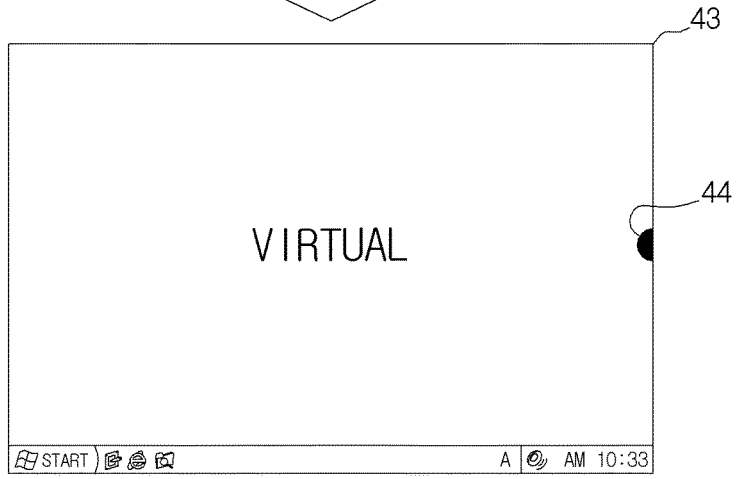
Figure 4:
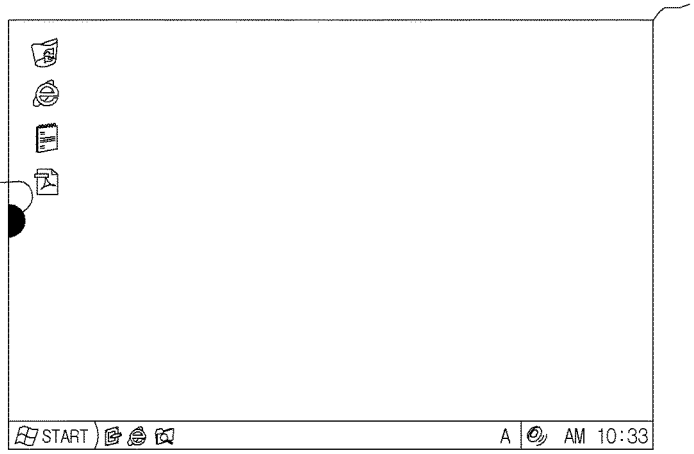

FIG. 4 illustrates an example of a GUI screen provided by the UI unit 310. Referring to FIG. 4, if a host computer is connected to a portable storage medium in which a virtual OS is installed, the UI unit 310 generates a log-in screen 42 and overlaps the log-in screen 42 on a desktop screen 41 of the host computer. If user authentication is completed through the log-in screen 42, the UI unit 310 overlaps a background screen provided by the virtual OS (i.e., a virtual desktop screen 43) on a background screen provided by the host OS. The user's computing environment may be incorporated on the background screen provided by the virtual OS. It is understood that aspects of the present invention are not limited to a user authentication. That is, according to other aspects, once the host computer is connected to the portable storage medium, the UI unit 310 overlaps the virtual desktop screen on the background screen of the host OS without user authentication.

The virtual desktop screen 43 includes a first icon 44 to change to the desktop screen 41. If the user clicks the first icon 44 using a device such as a mouse or a touch screen, the UI unit 310 generates a second icon 45 to change to the virtual desktop screen 43 and overlaps the second icon 45 on the desktop screen 41. However, it is understood that aspects of the present invention are not limited to the use of icons 44 and 45 to change between the virtual desktop screen 43 and the desktop screen 41. For example, according to other aspects, movement of a pointer on the screen to a corner of the screen may result in the switching between the desktops 41 and 43.

Referring back to FIG. 3, the virtual management unit 320 manages the status of the virtual OS and UI (for example, launching or termination). If the user logs into the virtual environment through the log-in screen 42 in FIG. 4, the virtual management unit 320 launches the virtual environment by attaching the virtual resource installed in the virtual OS to the host OS.

If the user requests termination of the virtual environment through the virtual desktop screen 43, the virtual management unit 320 stores a file generated by the virtual process and/or a program downloaded from a web server in the virtual environment in the mobile storage medium where the virtual OS is installed. For example, if the mobile storage medium is a cyber folder, the virtual management unit 320 stores files generated in the virtual environment and/or a program downloaded from a web server in the virtual environment in the cyber folder. Alternatively, if the mobile storage medium is a portable memory, the virtual management unit 320 stores files generated in the virtual environment and/or a program downloaded from a web server in the virtual environment in the portable memory through a driver of the portable memory. In addition, the virtual management unit 320 prevents a file generated in the virtual environment or a downloaded program from staying in the host computer or the host OS, thereby providing privacy to the user.

A system call occurring in the host application layer transmits a request for access corresponding to the system call to a host OS in the host OS layer. A system call occurring in the virtual process layer transmits a request for access corresponding to the system call to the host OS after virtualization is performed in the virtual OS layer.

Furthermore, the virtual OS unit 330 includes a process management unit 10, a virtual resource management unit 20, and a security management unit 30. If a process requests a system call (for example, registry, DLL, file I/O and so on), the process management unit 10 enables the virtual resource management unit 20 to determine whether to virtualize the system call. Accordingly, the process management unit 10 manages a process tree in order to determine whether the process that requests the system call is the host process or the virtual process.

In more detail, if the user logs into the virtual environment, the process management unit 10 generates a process tree structure to manage processes operated in the virtual OS in a process tree data base (DB). The virtual process tree structure is divided into a host process tree and a virtual process tree. The host process tree shows a hierarchical relationship of a process in the host OS, and the virtual process tree shows a hierarchical relationship of a process in the virtual OS. Therefore, when a process is activated in the virtual OS, the process management unit 10 generates a tree corresponding to the virtual process in the process tree DB. When a process is activated in the host OS, the process management unit 10 generates a tree corresponding to the host process in the process tree DB.

A system call generated by any process passes through the virtual layer (i.e., the virtual OS). In this case, the process management unit 10 confirms, by using the process tree, whether the system call is generated by a process operated in the virtual environment or by a host process. The process management unit 10 notifies the virtual resource management unit 20 of the confirmation results.

If the system call is generated by a host process, the virtual resource management unit 20 bypasses the system call to the host OS. Conversely, if the system call is generated by a virtual process, the virtual resource management unit 20 performs virtualization, and transmits a request for the system call to the host OS. Virtualization changes an access path parameter in order for the system call to access the virtual resource provided by the virtual OS if the system call is determined to be generated by a virtual process.

The virtual resource may include data configuration information, virtual dynamic link library (DLL), a virtual service program, virtual desktop environment information, and virtual file I/O information. To this end, the virtual resource management unit 20 includes a virtual configuration management unit 21, a virtual DLL management unit 22, a virtual service management unit 23, a virtual file I/O management unit 24, and a virtual desktop management unit 25.

If the system call is input from the virtual process, the virtual configuration management unit 21 asks the process management unit 10 which process generates the system call. Accordingly, if the system call requests configuration access, the virtual configuration management unit 21 enables the system call to access a virtual configuration attached to the host OS. A configuration is a data base in which information that is used to execute the OS is stored. For example, a configuration includes information regarding installation locations of hardware, software, and a network driver in a computer. For example, if the OS is WINDOWS™ provided by Microsoft, a configuration is a registry of WINDOWS™.

Furthermore, if the system call is input from the virtual process, the virtual DLL management unit 22 asks the process management unit 10 which process generates the system call. Accordingly, if the system call requests a DLL file, the virtual DLL management unit 22 enables a virtual DLL from among the virtual resources attached to the host OS to be used. In other words, the virtual DLL management unit 22 enables the system call to access the virtual DLL.

Additionally, if the system call generated by the virtual process requests the use of a service program, the virtual service management unit 23 executes a virtual service program that is executed in the virtual OS so that the requested service can be executed. An example of a system call requesting a service is a time job. A time job is a set job performed at a reserved time. The virtual service management unit 23 performs the set job by executing a service program corresponding to the time job at a reserved time.

If the system call is input from the virtual process, the virtual file I/O management unit 24 asks the process management unit 10 which process generates the system call. Accordingly, if the system call requests file I/O, the virtual file I/O management unit 24 enables a corresponding file from among the files stored in the mobile storage medium to be read out.

The virtual desktop management unit 25 provides a computing environment that the user wishes to use. For example, if the user makes a desired virtual computing environment by setting desired icons, a desired arrangement of the icons, a background screen, a keyboard setting, a mouse setting, and a language setting, the virtual desktop management unit 25 remembers the set virtual computing environment to use the set virtual computing environment at any computer. Accordingly, when the user works in the virtual environment, the same UI can be provided regardless of the computer being used, and the user can use the same computing environment at any computer. Therefore, the UI unit 310 can generate a virtual desktop screen incorporating a virtual computing environment provided by the virtual desktop management unit 25.

The security management unit 30 prevents security breaches (for example, virus attacks, and leakages of personal information or banking information when the user uses another person's computer or a public computer).

Figure 5:
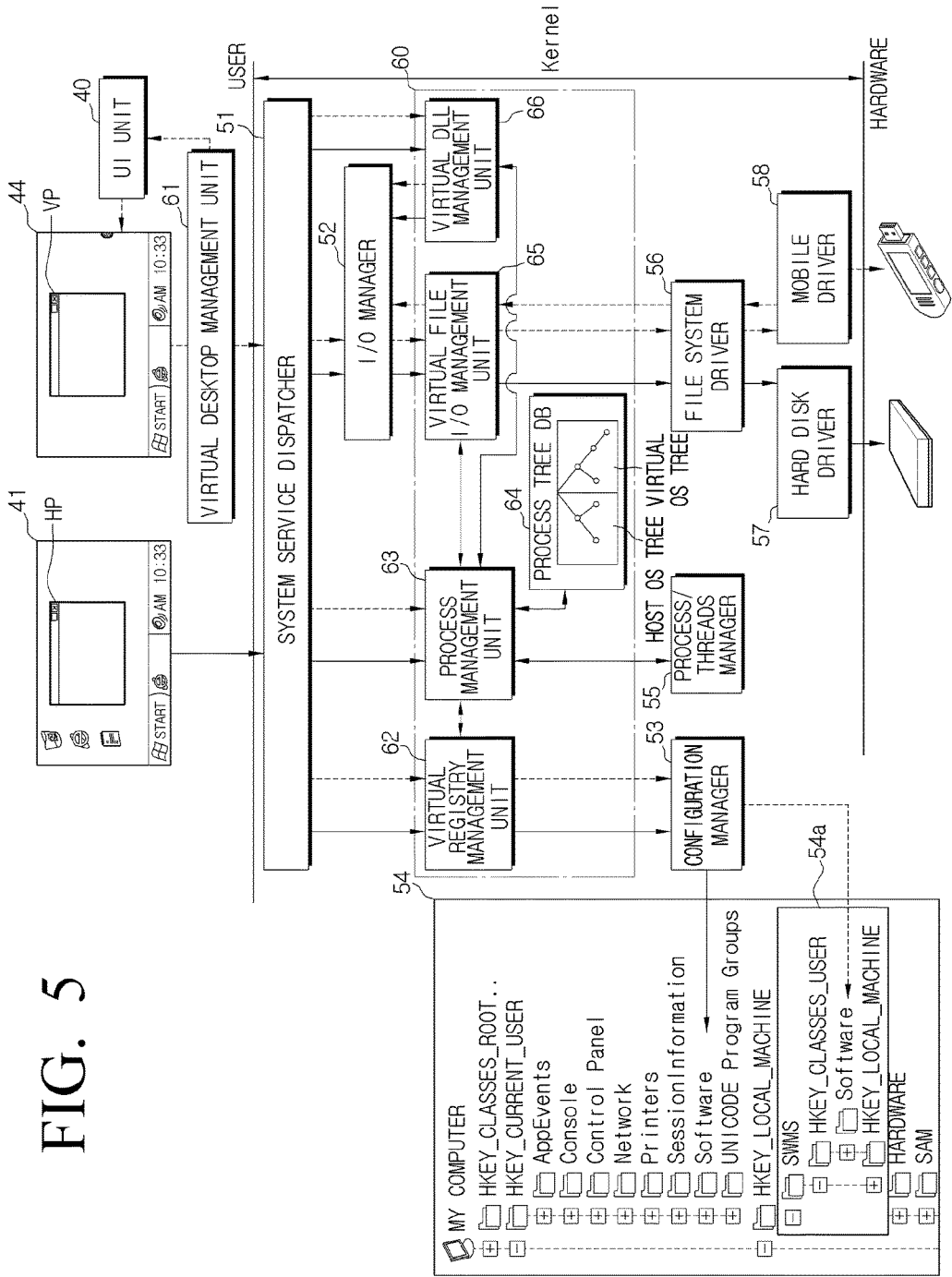
FIGS. 5 and 6 illustrate operations in a virtual environment when an OS is Windows according to an embodiment of the present invention.
Figure 6:
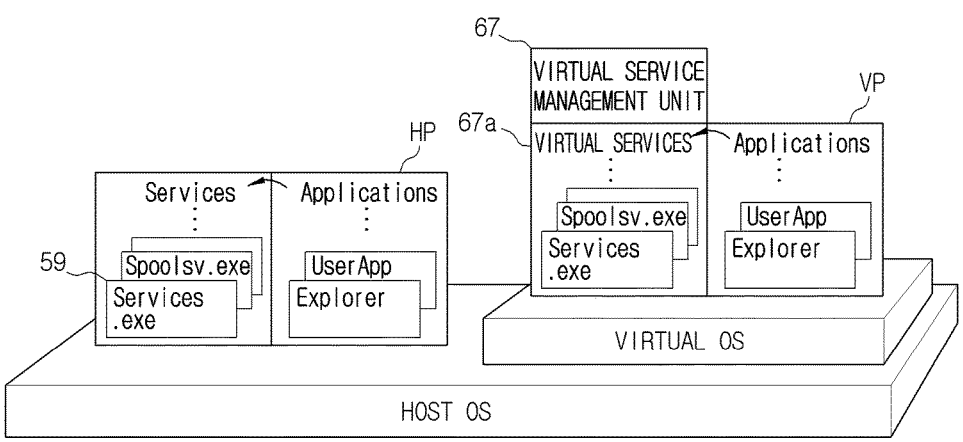

FIGS. 5 and 6 illustrate operations in a virtual environment when an OS is WINDOWS™ according to an embodiment of the present invention. In FIG. 5, it is assumed that a host OS installed in a host computer and a virtual OS installed in a mobile storage medium are WINDOWS™, and the mobile storage medium is a USB memory, though it is understood that aspects of the present invention are not limited to WINDOWS™ as an OS and a USB memory as the mobile storage medium. Hereinafter, the host OS is referred to as host WINDOWS™, and the virtual OS is referred to as virtual WINDOWS™. Virtual WINDOWS™ and programs are installed in the USB memory, so virtualization is enabled in a host computer without installing the virtual WINDOWS™ and programs in the host computer.

Referring to FIGS. 5 and 6, the host WINDOWS™ and a virtual WINDOWS™ unit 60 are located in a kernel of WINDOWS™. The host WINDOWS™ includes a system service dispatcher 51, an I/O manager 52, a configuration manager 53, a registry 54, a process/threads manager 55, a file system driver 56, a hard disk driver 57, and a mobile driver 58. The virtual WINDOWS™ unit 60 includes a virtual desktop management unit 61, a virtual registry management unit 62, a process management unit 63, a process tree DB 64, a virtual file I/O management unit 65, a virtual DLL management unit 66, and a virtual service management unit 67. The virtual management unit 320 and the virtual process unit 340 of FIG. 3 are not illustrated in FIGS. 5 and 6.

If the USB memory is connected to the host computer while the user is using a host process (HP) on the host WINDOWS™, the UI unit 40 displays a log-in screen 42 to enter a virtual environment on the host computer screen. When the user inputs his or her ID and password, the virtual management unit 320 performs user authentication. After user authentication is completed, the UI unit 40 overlaps a virtual desktop screen 44 on the host computer screen 41. The virtual desktop management unit 61 maintains or remembers a virtual computing environment preset by the user on the virtual desktop screen 44, mouse, language and so on.

In addition, after user authentication is completed, the virtual management unit 320 attaches a virtual resource included in the virtual WINDOWS™ to the host WINDOWS™. Specifically, the virtual management unit 320 attaches a virtual registry included in the virtual WINDOWS™ to a registry of the host WINDOWS™. The virtual resource may include a virtual registry, a virtual file I/O, a virtual DLL, a virtual desktop environment, and a virtual service program, whereby "virtual" refers to an operation in a virtual environment. As a result, the virtual environment is activated, and without installing a separate application program in the host computer or moving an application program installed in the USB memory to the host computer, the user can execute the application program installed in the USB memory using the host computer.

If a virtual process (VP) operated in the virtual WINDOWS™ is activated (for example, an application program is activated on the virtual desktop screen 44) the process management unit 63 generates a tree corresponding to the virtual process on the virtual WINDOWS™ area of the process tree DB 64. Moreover, if a system call related to a registry is generated by the virtual process, the system service dispatcher 51 interfaces the system call with the kernel of the WINDOWS™. That is, all of the system calls generated by an operating process are dispatched to an internal service of the kernel through the system service dispatcher 51 in the kernel. For example, if the system call requests access to the registry, the system service dispatcher 51 transfers the system call to the virtual registry management unit 62. If the system call requests file I/O, the system service dispatcher 51 transfers the system call to the I/O manager 52. If the system call requests DLL, the system service dispatcher 51 transfers the system call to the virtual DLL management unit 66.

The I/O manager 52 performs in/out processing in the WINDOWS™ kernel. In particular, the I/O manager 52 transfers a system call related to file I/O input from the system service dispatcher 51 to the virtual file I/O management unit 65. In addition, if the virtual DLL management unit 66 requests in/out of a DLL file, the I/O manager 52 transfers in/out of the requested DLL file to the virtual file I/O management unit 65.

The virtual registry management unit 62 corresponding to the virtual configuration management unit 21 asks the process management unit 63 whether a system call input through the system service dispatcher 51 is generated by a virtual process. Accordingly, the process management unit 63 determines whether the process requesting the system call is a host process or a virtual process by identifying the process tree DB 64.

If the system call is generated by the virtual process and requests access to the virtual registry, the virtual registry management unit 62 performs virtualization of the system call. That is, the virtual registry management unit 62 changes an access path parameter in order for the system call to access a virtual registry 54a instead of the registry 54 of the host window. The virtual registry 54a is a registry included in the virtual WINDOWS™, and is attached to the registry 54 of the host WINDOWS™.

The process tree DB 64 is a process tree structure that determines whether a process requesting the system call is a host process or a virtual process. Whenever a virtual process or a host process is executed, the tree is increased by the process management unit 63.

The virtual file I/O management unit 65 asks the process management unit 63 whether the system call received from the I/O manager 52 is generated by the virtual process. If the system call is generated by the virtual process, the virtual file I/O management unit 65 controls the file system driver 56 to access the files stored in the USB memory and read out a corresponding file. Conversely, if the system call is generated by the host process, the virtual file I/O management unit 65 controls the file system driver 56 to access a local storage (such as a hard disk drive (HDD)).

The virtual DLL management unit 66 asks the process management unit 63 whether the system call input through the system service dispatcher 51 is generated by the virtual process. If the process management unit 63 determines that the system call requesting use of the DLL is generated by the virtual process, the virtual DLL management unit 66 controls the DLL of the virtual WINDOWS™ to be used instead of the DLL of the host WINDOWS™. That is, the virtual DLL management unit 66 requests that the virtual file I/O management unit 65 reads out a DLL file through the I/O manager 52. The virtual file I/O management unit 65 controls the file system driver 56, reads out a corresponding DLL file from the USB memory, and provides the virtual DLL management unit 66 with the DLL file. The virtual DLL management unit 66 transfers the DLL file to the virtual process so that the virtual process can be used.

If the virtual process requests that a service program be used, the virtual service management unit 67 performs a service using a virtual service program 67a operated for a virtual process as opposed to the service program 59 of the host WINDOWS™. To this end, the virtual service management unit 67 stores and manages a plurality of virtual services programs 67a (such as Spoolsv.exe and Services.exe), as shown in FIG. 6.

The configuration manager 53 manages the registry 54 in the kernel of the host WINDOWS™, and accesses data of the virtual registry 54a or the host registry 54 according to a control of the virtual registry management unit 62.

The process/threads manager 55 provides the process management unit 63 with the ID of the host process or the virtual process that is activated, and manages generation, termination and performance of a process and thread in the kernel. The process management unit 63 generates a process tree using the ID.

The file system driver 56 implements a file system in the kernel, and controls the hard disk driver 57 or the mobile driver 58 to read out a corresponding file. The file system driver 56 may be managed by the I/O manager 52. The hard disk driver 57 drives the HDD installed in the host computer. The mobile driver 58 drives the USB memory.

Using the above described virtual environment system, if the user writes a document on the virtual desktop screen 43 using the virtual process (VP) or downloads a program from the web on the virtual desktop screen 43, the virtual management unit 320 stores the written document or the downloaded program in the USB memory if the user requests. If the user requests termination of the virtual environment, the virtual management unit 320 may delete all of the files generated in the virtual environment from the host computer.

Figure 7:
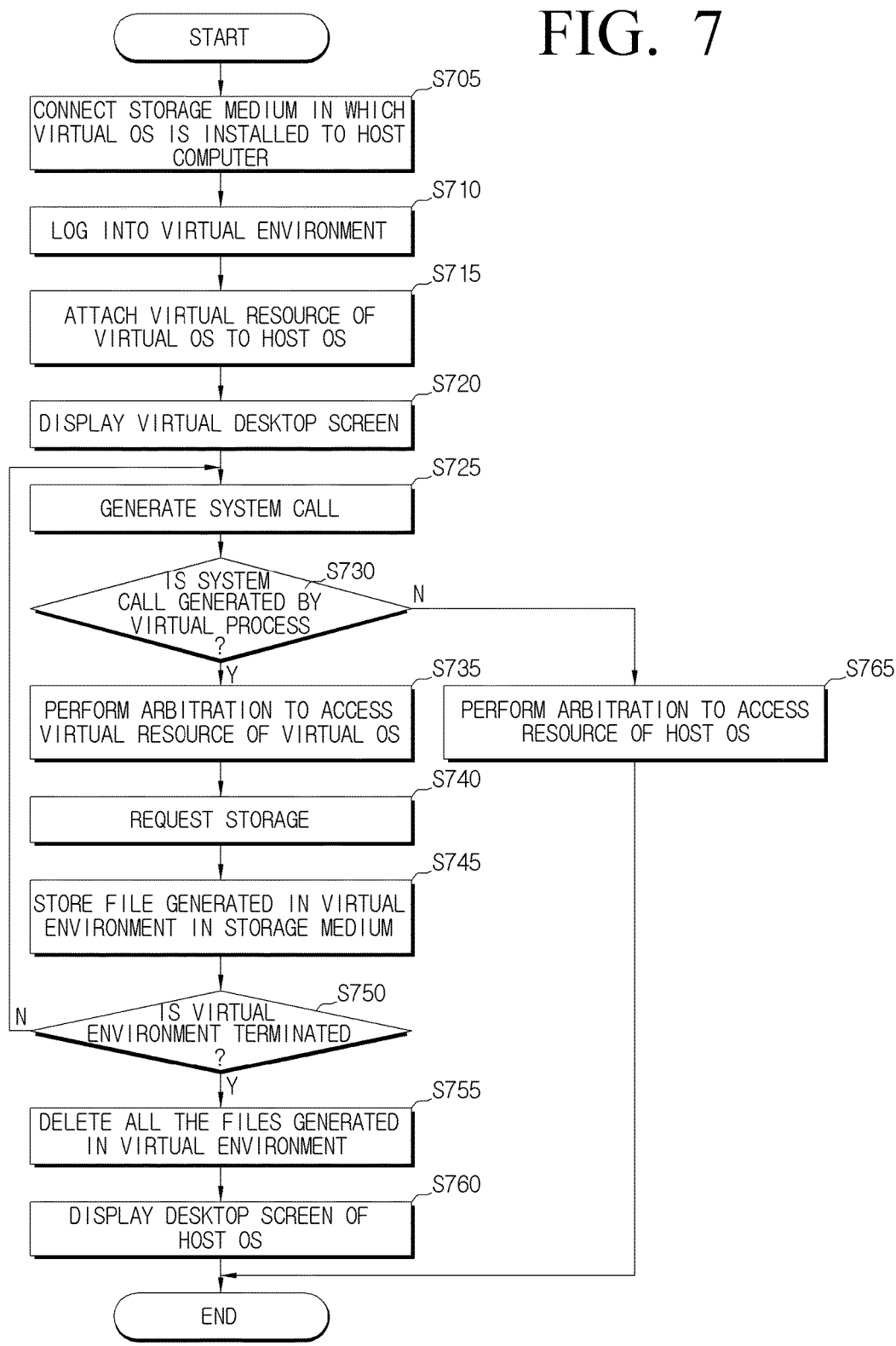
FIG. 7 is a flowchart illustrating a method of operating a virtual environment system according to an embodiment of the present invention.

FIG. 7 is a flowchart illustrating a method of operating a virtual environment system according to an embodiment of the present invention. Referring to FIGS. 3 to 7, when a mobile storage medium in which a virtual OS is installed is connected to a host computer in operation S705, the UI unit 40 of the virtual OS displays a log-in screen to enter a virtual environment. Accordingly, the user logs into the virtual OS using authentication information (such as his or her ID and password) in operation S710.

Subsequently, the virtual management unit 320 attaches a virtual resource of the virtual OS to a host OS in operation S715, and the virtual desktop management unit 61 controls the UI unit 40 to generate and display a virtual desktop screen 43 according to a personal computing environment in operation S720. As a result, the user can enter the virtual environment and, for example, write a document or activate an application program in the virtual environment.

If a system call is generated in operation S725, the process management unit 10 determines whether the system call is generated by the virtual process using the process tree DB 64 in operation S730. Accordingly, the virtual resource management unit 20 performs arbitration in order for processes operated in the virtual OS to access a virtual resource.

Specifically, if the system call is generated by the virtual process, the virtual resource management unit 20 performs an operation corresponding to the system call using the virtual resource of the virtual OS in operation S735. For example, if the generated system call (operation S725) requests access to a registry, the virtual resource management unit 20 controls the configuration manager 53 to access a virtual registry from among a registry of the host OS.

If the user requests that a file written in the virtual environment or a program downloaded in the virtual environment be stored in operation S740, the virtual management unit 320 stores the file or the program in the mobile storage medium in operation S745. Furthermore, if the user requests termination of the virtual environment in the virtual desktop screen 43 in operation S750, the virtual management unit 320 deletes all the files generated in the virtual environment in operation S755. Consequently, the host computer displays a desktop screen of the host OS in operation S760.

Going back to operation S730, if it is determined that the system call is generated by the host process, the virtual resource management unit 20 accesses the resources of the host OS in order to perform an operation corresponding to the system call in operation S765.

As described above, according to aspects of the present invention, a user sets and installs a personal computing environment including diverse programs and files in a mobile storage medium, and can use a virtual environment in another computer using the mobile storage medium without installing the programs and files thereto. Furthermore, since documents written in the virtual environment are stored in the mobile storage medium and not stored in the computer, personal information and privacy can be protected. In addition, according aspects of the present invention, since the personal computing environment set or installed in the mobile storage medium can be backed up in other computers or storage media, the personal computing environment can be saved when the mobile storage medium is lost or broken.

Aspects of the present invention can also be embodied as computer-readable codes on a computer-readable recording medium. Also, codes and code segments to accomplish the present invention can be easily construed by programmers skilled in the art to which the present invention pertains. The computer-readable recording medium is any data storage device that can store data which can be thereafter read by a computer system or computer code processing apparatus. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Aspects of the present invention may also be realized as a data signal embodied in a carrier wave and comprising a program readable by a computer and transmittable over the Internet.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A computer-implemented method of operating a virtual environment system, the method comprising:
attaching a virtual resource of a virtual operating system (OS) installed in a mobile storage device to a host OS installed in a host computer in response to the mobile storage device being connected to the host computer while a host desktop screen is provided, the virtual resource comprising the virtual OS, a graphical user interface data used for a virtual process and management data used for managing the virtual process;
providing a virtual desktop screen such that a user uses the virtual process in a virtual environment provided by the virtual OS;
generating a process tree structure in a process tree database, the process tree structure comprising a host process tree generated in response to a process being activated on the host OS and a virtual process tree generated in response to a process being activated on the virtual OS;
in response to a system call being received by the virtual OS, identifying whether the system call is generated by a host process operating within the host OS or the virtual process operating within the virtual OS by using the process tree structure based on the host process tree and the virtual process tree;
passing the system call onto the host OS and processing the system call by the host OS, in response to the system call being generated by the host process; and
performing virtualization with regard to the system call and requesting access of the system call, in response to the system call being generated by the virtual process, the virtualization changing an access path parameter in order for the system call to access the virtual resource; and
in response to a user command for terminating the virtual environment being input storing in the mobile storage device all files generated in the virtual environment, deleting said all files in the host computer and providing the host desktop screen.

2. The method as claimed in claim 1, wherein the attaching of the virtual resource comprises:
providing a log-in screen so that the user logs into the virtual OS;
logging into the virtual environment using the log-in screen; and
attaching the virtual resource to the host OS and starting the virtual environment when the virtual environment is logged into.

3. The method as claimed in claim 1, wherein the mobile storage device is a portable storage medium or a cyber folder.

4. The method as claimed in claim 1, wherein the virtual desktop screen comprises an icon to change between an environment using the host OS and the virtual environment using the virtual OS.

5. The method as claimed in claim 1, further comprising:
accessing virtual configuration data of the virtual OS that is attached to the host OS if the system call requests access to a configuration of the virtual OS;
controlling a path to access a file stored in the mobile storage device if the system call requests file input/output (I/O); and
enabling a virtual dynamic link library (DLL) of the virtual OS that is attached to the host OS if the system call requests a DLL.

6. The method as claimed in claim 5, further comprising providing a virtual service program operated for the virtual process in order to execute a real service if the system call requests use of a service program.

7. The method as claimed in claim 1, wherein the virtual resource comprises registry data, file input and output information, and/or dynamic link library (DLL) information.

8. The method as claimed in claim 1, further comprising communicating, by the virtual OS, to the host OS an access path parameter indicating to the host OS that the system call accesses the virtual resource, if the system call is determined to be generated by the virtual process.

9. A non-transitory computer readable recording medium comprising instructions that, when executed by a computer, implement the method of claim 1.

\* \* \* \* \*